Aug. 15, 1944.   D. S. BURLEIGH   2,355,779
AUTOMATIC PHOTOGRAPHIC MACHINE
Filed July 1, 1942    5 Sheets-Sheet 2

Inventor
DAVID SAMUEL BURLEIGH
By Francis E. Boyce
ATTORNEY

Aug. 15, 1944.    D. S. BURLEIGH    2,355,779
AUTOMATIC PHOTOGRAPHIC MACHINE
Filed July 1, 1942    5 Sheets-Sheet 3

Inventor
DAVID SAMUEL BURLEIGH
By Francis E. Boyce
ATTORNEY

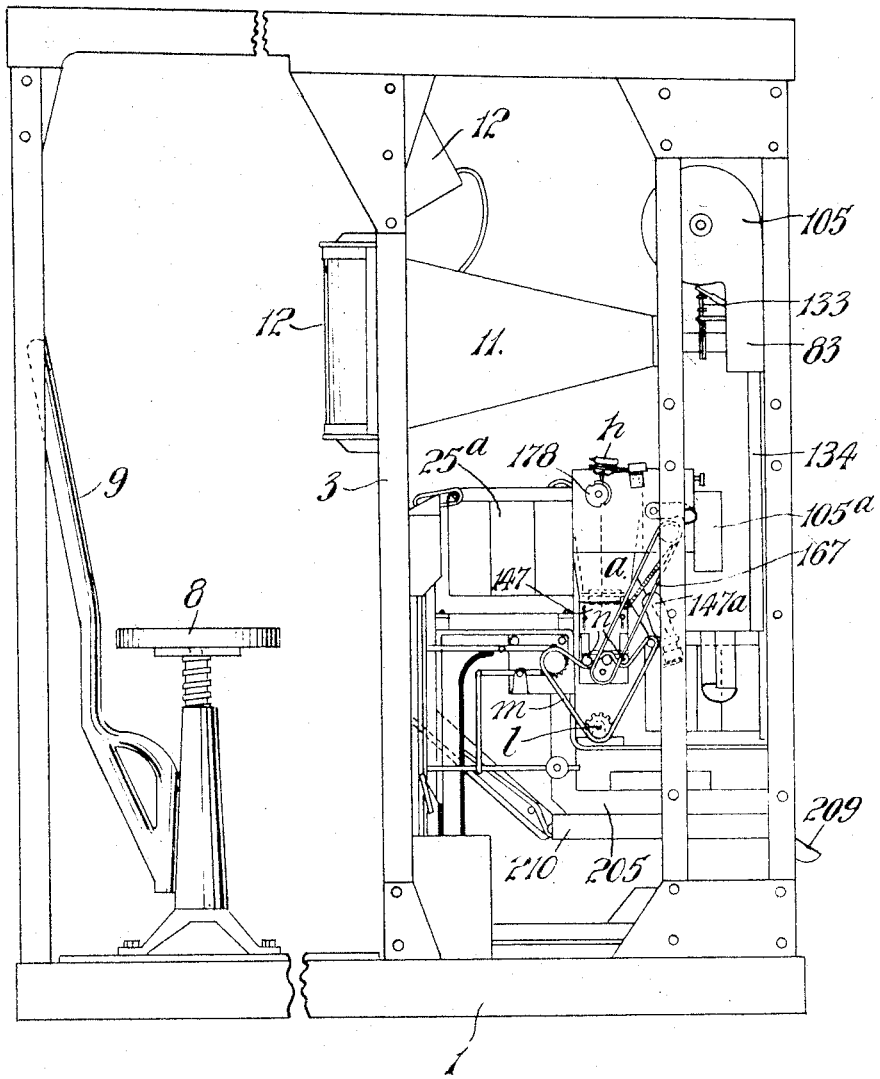

Aug. 15, 1944.   D. S. BURLEIGH   2,355,779
AUTOMATIC PHOTOGRAPHIC MACHINE
Filed July 1, 1942   5 Sheets-Sheet 5

Inventor
DAVID SAMUEL BURLEIGH
By Francis E. Boyce
ATTORNEY

Patented Aug. 15, 1944

2,355,779

UNITED STATES PATENT OFFICE 2,355,779

AUTOMATIC PHOTOGRAPHIC MACHINE

David Samuel Burleigh, Wembley, England

Application July 1, 1942, Serial No. 449,235
In Great Britain July 29, 1941

2 Claims. (Cl. 88—24)

This invention relates to automatic photographic machines, of the kind in which negative photographs are automatically brought into position and illuminated opposite a camera wherein and whereby positive photographs are produced and the positive photographs are traversed through developing, fixing and washing tanks and, preferably after drying, are delivered outside the machine. Preferably the machine also automatically produces, in another camera, the negative photographs, which are of persons illuminated in front of such camera, and the negatives are traversed through developing, fixing and washing tanks and then brought into position and illuminated opposite the positive camera.

The object of the present invention is to enable a machine of the above kind to produce two positive photographs simultaneously from a single negative, for instance to serve as passport photographs.

For the above purpose, according to the invention, a machine wherein negative photographs are brought into position and illuminated to enable positive photographs to be produced therefrom, is provided with two closely mutually adjacent cameras located both simultaneously to photograph the illuminated negative and produce positive photographs thereof.

The two positive cameras and their lenses are preferably so closely mutually adjacent that the two positive photographs are produced without any intervening gap on a single light-sensitised paper strip located along the focal plane of the two positive cameras conjointly.

The lenses of the positive cameras are preferably matched to produce practically identically similar positive photographs so as to serve as duplicate passport photographs. The positive photographs may be enlargements of the negative photograph.

The two positive cameras are, for instance, formed by a diverging chamber of rectangular transverse cross section, divided longitudinally by a partition, with the lenses of the two cameras located close to and each on a different side of the partition, at the smaller closed end of the divided chamber.

An embodiment of the invention is illustrated, by way of example, on the accompanying drawings, in which the duplex positive camera is shown mounted in an automatic photographic machine of the kind described. In these drawings.

Figure 1:
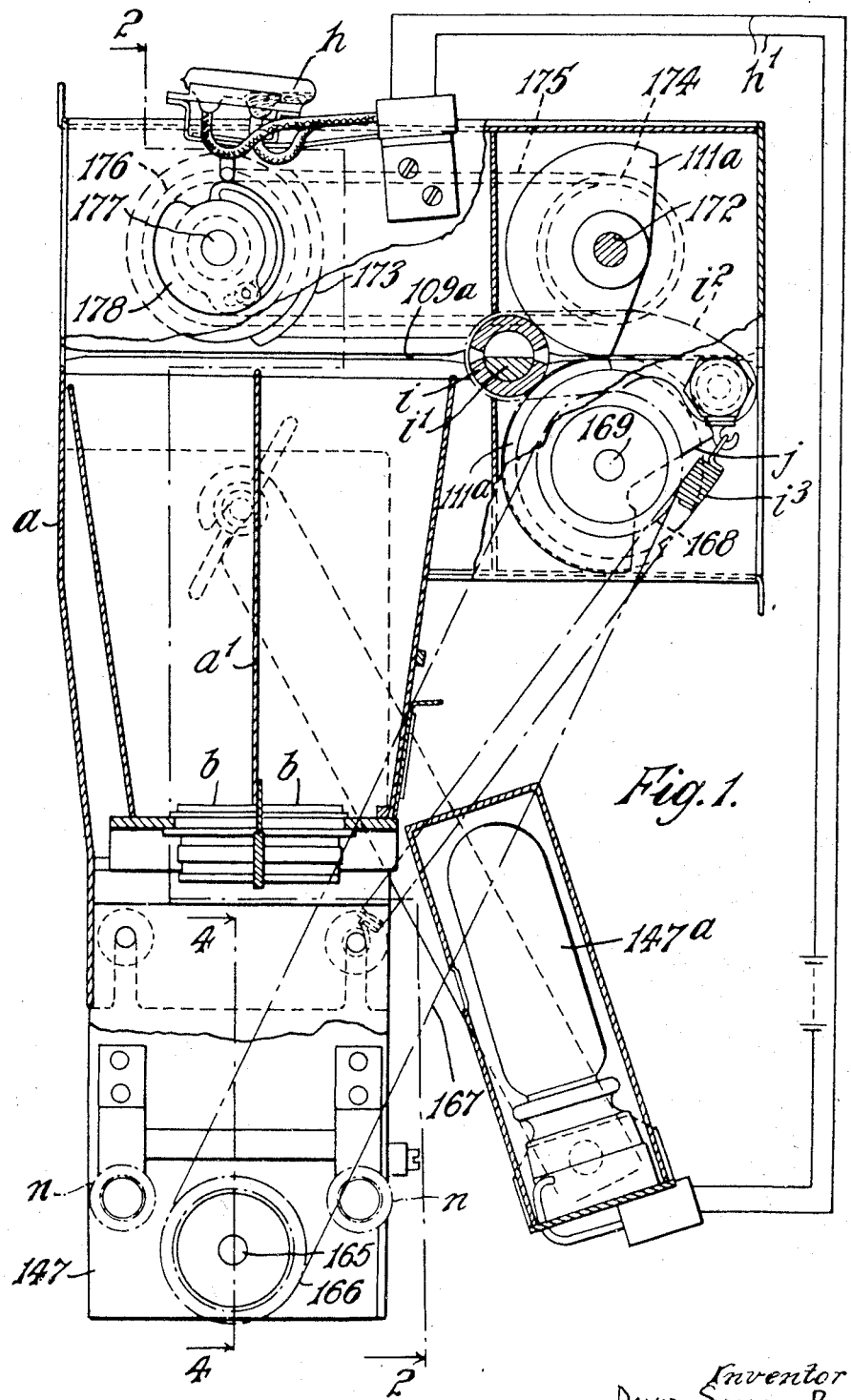
Fig. 1 is a vertical sectional side elevation.
Figure 2:
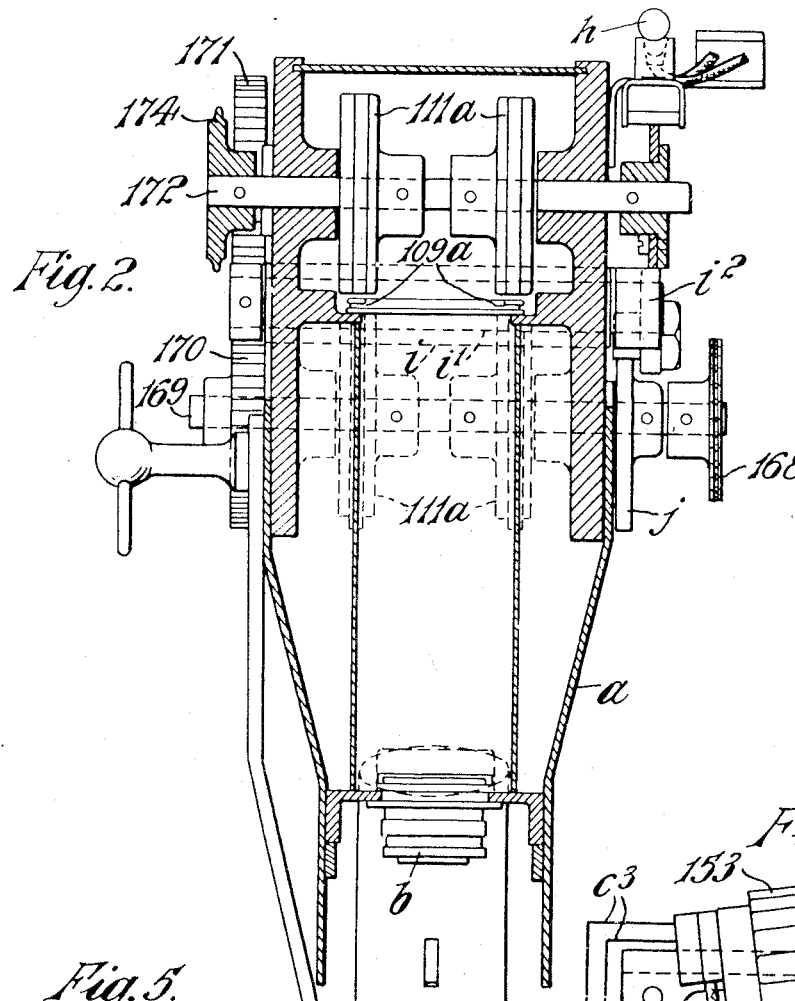
Fig. 2 is a transverse vertical section on the line 2—2 of Fig. 1.
Figure 5:
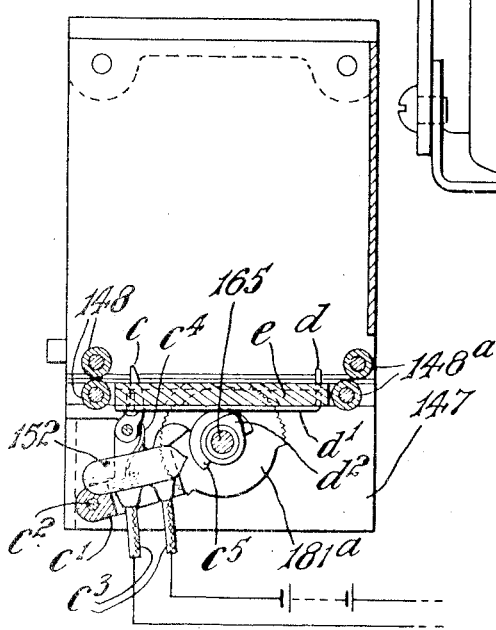
Figure 6:
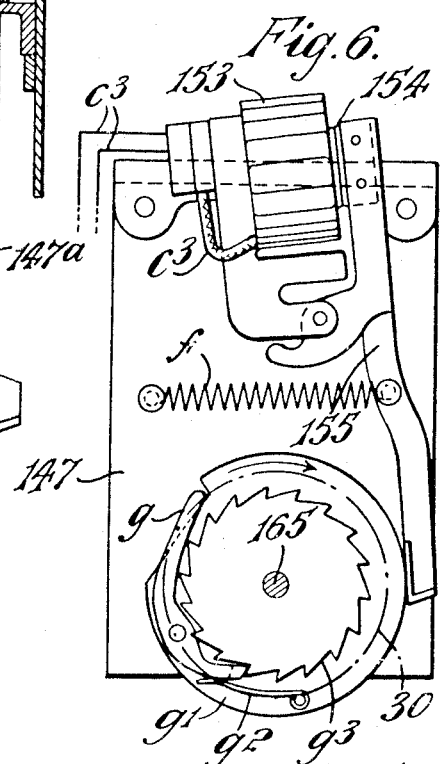
Figure 3:
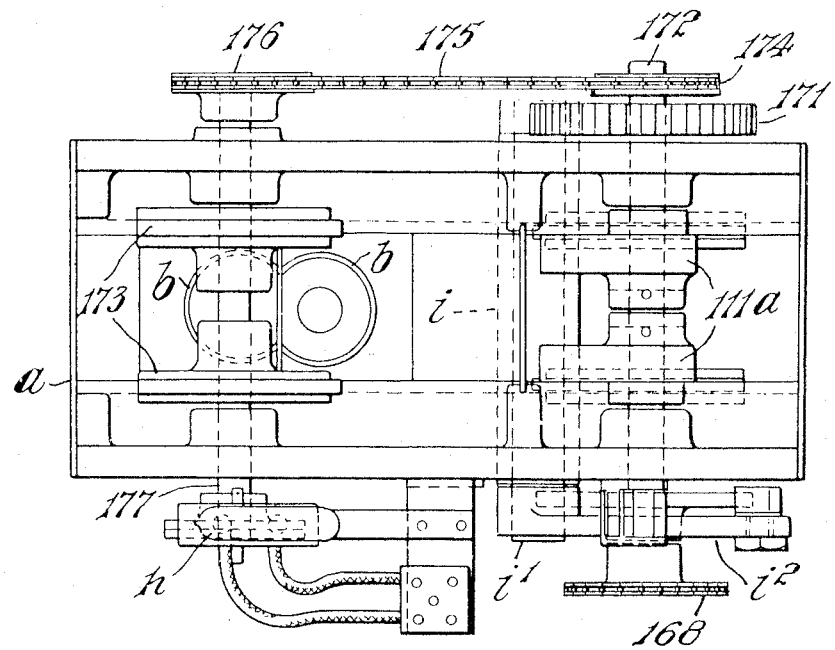
Fig. 3 is a plan of the duplex positive camera.
Figure 4:
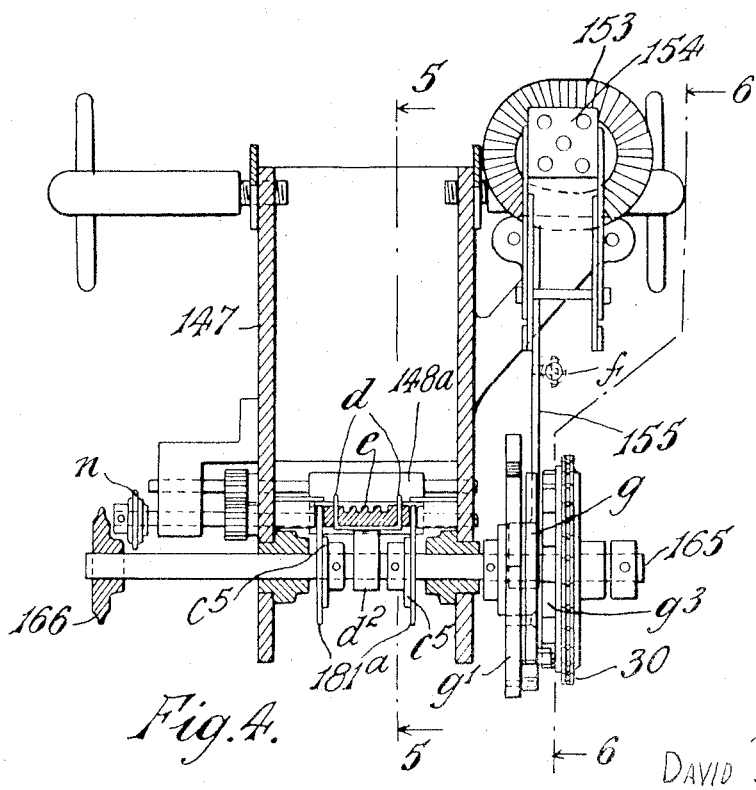
Figure 6:
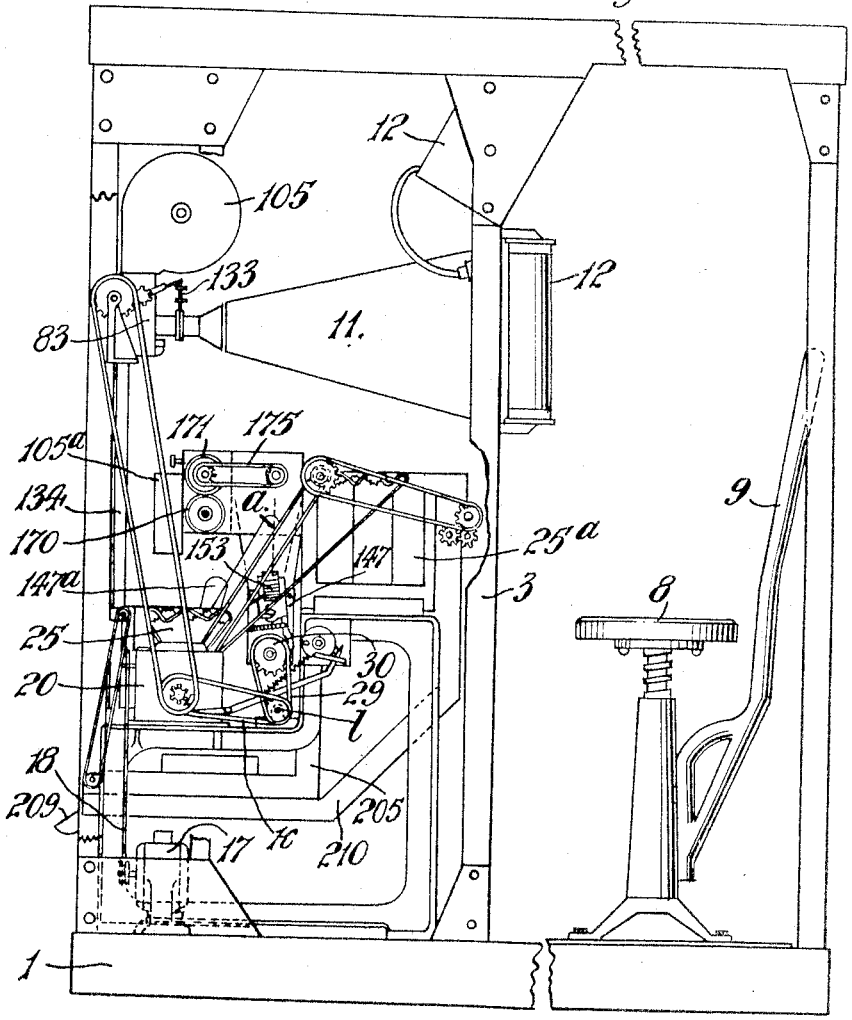

Fig. 4 is a vertical section on the line 4—4 of Fig. 1, of the portion of the machine wherein the negative photograph is illuminated beneath the duplex positive camera, Fig. 5 is a vertical section on the line 5—5 of Fig. 4, and Fig. 6 is a side elevation corresponding to Fig. 4, partly in section on the line 6—6 of Fig. 4.

Figs. 7 and 8 are side elevations on a smaller scale showing, more or less diagrammatically, the relation of the duplex positive camera to the remainder of an automatic photographic machine.

$a$ is a downwardly directed duplex camera, comprising an upwardly divergent chamber of rectangular cross section divided longitudinally by a partition $a^1$ and provided with a pair of closely adjacent lenses $b$, located one on each side of the partition $a^1$. A strip of sensitised paper is fed along the focal plane of the lenses $b$, as will be described hereafter, and a negative photograph, located at the lower end of an extension 147 of the positive camera $a$, is illuminated, whereby two positive photographs are taken of the negative, one on each of the two portions of the sensitised strip on each side of the partition $a^1$.

The mechanism whereby the negative is placed in position will first be described. The negative, which is a severed paper strip or ticket is delivered into the position for illumination in the camera extension 147, by a constantly rotating pair of feed rolls 148, Fig. 5. On entering the camera extension 147, from the left hand as viewed in Fig. 5, the negative encounters and depresses an upstanding finger $c$. This finger $c$ is mounted on a lever frame $c^1$, pivoted at $c^2$, on which a mercury switch 152 is mounted. The depression of the finger $c$ causes the lever frame $c^1$ to drop angularly and thereby tilts the mercury switch 152 to close an electric circuit through electric leads $c^3$.

The finger $c$ is itself yieldingly pivoted on the lever frame $c^1$ against the influence of a blade spring $c^4$ so as to allow the negative to pass such finger $c$.

The negative after leaving the feed rolls 148 eventually encounters and is arrested by an upstanding abutment $d$ carried by a blade spring $d^1$, secured to the underside of a platform $e$ on which the negative rests, and which spring $d^1$ tends to withdraw the abutment $d$ downwards.

As shown in Fig. 4 this platform $e$ is grooved on the upper surface to avoid undue adhesion of the negative which arrives thereon wet from the negative developing, fixing and washing series of tanks 25, shown in Fig. 8.

The closure of the electric circuit through the leads $c^3$ energises an electro-magnet 153, Figs. 4 and 6, to attract an armature 154 to rock a lever 155, against the returning influence of a spring $f$. The lever 155 when not displaced by the magnet 153 is drawn by the spring $f$ to be encountered by and bear against the tail of a pawl $g$ pivoted on a disc $g^1$. This disc $g^1$ is fast on a shaft 165, on which a constantly rotating sprocket wheel 30 is freely mounted. The pawl $g$ tends under the influence of a blade spring $g^2$ to engage with its nose a tooth of a ratchet wheel $g^3$, formed on the boss of the constantly rotating freely mounted sprocket wheel 30. When the magnet 153 removes the lever 155 from gearing on the tail of the pawl $g$, the spring $g^2$ rocks the pawl $g$ to engage its nose with a tooth of the ratchet wheel $g^3$, and the shaft 165 thus becomes coupled to and rotated by the sprocket wheel 30. Only one complete rotation of the shaft 165 occurs before the lever 155, released by the de-energised magnet 153, again bears on the tail of the pawl $g$, and uncouples the shaft 165.

$181^a$ are peripherally gapped serrated discs fast on the shaft 165 which engage and advance the negative into position, disengage from and allow the negative to remain stationary, and eventually re-engage and feed the negative into engagement with constantly rotating delivery rolls $148^a$, during the single rotation of the shaft 165.

$d^2$ is a cam on the shaft 165 which holds up the above-mentioned blade spring $d^1$ and abutment $d$ until near the end of the rotation of the shaft 165.

A pair of cams $c^5$ on the shaft 165 restores the lever frame $c^1$ and mercury switch 152 during the rotation of the shaft 165, whereby the magnet 153 becomes de-energised. A gap in these cams $c^5$ permits the lever frame $c^1$ and mercury switch 152 to drop when the finger $c$ is depressed by the incoming negative, as described above.

A sprocket wheel 166 fast on the shaft 165 is connected by a chain 167 to a sprocket wheel 168 at the upper end of the duplex positive camera $a$. This sprocket wheel 168 is fast on a shaft 169 on which is fast a spurwheel 170. This spurwheel 170 meshes with a spurwheel 171 of equal size fast on a shaft 172. The two shafts 169 and 172 are, in the present construction located one above and one below the focal plane of the duplex positive camera and both have fast thereon, peripherally gapped discs $111^a$ which are opposed and engage and feed a sensitised paper strip, from a reel casing $105^a$, into guide grooves $109^a$ extending along the focal plane of the duplex camera. These peripherally gapped discs $111^a$ rotate out of engagement with the strip when the latter has extended across both the cameras of the duplex positive camera $a$.

A sprocket wheel 174 fast on the shaft 172 is connected by a chain 175 to a sprocket wheel 176 of equal diameter fast on a shaft 177. Peripherally gapped discs 173 are fast on this shaft 177 and also an adjustable cam 178. The cam 178 is so timed that when the positive strip is in the exposure position, it permits a mercury switch $h$ momentarily to tilt whereby an electric lamp $147^a$, in an electric circuit $h^1$, is energised and illuminates the negative. The peripherally gapped discs 173 eventually engage and feed the positive out of the exposure position and the positive camera, into engagement with the entry rolls of positive developing, fixing and washing tanks $25^a$.

Before passing into the developing, fixing and washing tank $25^a$, the portion of the sensitised paper strip exposed to the illuminated negative is severed from the remainder. This is effected by a cutter consisting of a slotted sleeve $i$ through the slots of which the paper strip passes to reach the exposure position and within which is journalled a spindle $i^1$ of half-round cross section. A lever arm $i^2$ is fast on the half-round spindle $i^1$ to make a partial rotation, when the lever $i^2$ ceases to be upheld by an interrupted cam $j$ on the shaft 169. This partial rotation of the half-round spindle $i^1$ shears the paper strip between an edge of one of the slots in the sleeve $i$ and an edge of the half-round spindle $i^1$.

The existing automatic photographic machine to which the invention is applied and which is diagrammatically illustrated in Figs. 7 and 8, comprises a cabinet having a base 1 and housing the photographic mechanism in a compartment, at one side of a transverse partition 3, closed by removable walls, assumed to have been removed to permit inspection of the mechanism. The compartment on the other side of the partition 3 provides a transverse passage through the cabinet wherein is an adjustable seat 8 having a back rest 9. In front of the seat 8, at about the height of a sitter's head, is mounted a funnel-like shade 11, leading to a camera 83 in which a negative of the sitter is taken on a sensitised paper strip from a spool casing 105. The exposure in the negative camera 83 is effected, whilst the sitter is illuminated by electric lamps contained in casings 12, by operation of the shutter operator 133, this automatically taking place during running of the machine.

The negative photograph is severed by mechanism similar to that described above in connection with the duplex positive camera $a$. The severed negative drops down a chute 134, at the bottom of which it is conveyed through negative developing tanks 25, from which the developed negative is delivered into the positive camera extension 147, by the constantly rotating pair of feed rolls 148, Fig. 5, as already described.

After leaving the positive camera extension 147, the negative is delivered along a casing 205 to a trough 209. The positive, after leaving the developing tanks $25^a$, similarly is delivered along a casing 210 to the trough 209.

When the machine is in operation, its various mechanisms are driven by a constantly running electromotor 17, which drives a speed reduction gear box 20 by a belt 18. From this gear box 20, the several mechanisms are driven by endless chains. Only those which operate the above described duplex camera need be identified and are as follows.

As shown in Fig. 8, an endless chain $k$ drives a countershaft $l$, from which another endless chain 29 is led around and drives the above described constantly rotating sprocket wheel 30. On the other side of the machine, Fig. 7, the countershaft $l$ drives an endless chain $m$ which, diverted around jockey sprocket wheels, is in engagement with and drives sprocket wheels $n$ on the spindles of the above described constantly rotating negative feed rolls 148 and delivery rolls $148^a$.

I claim:

1. In an automatic photographic machine, two closely mutually adjacent downwardly directed cameras, peripherally gapped discs discontinuously engaging a negative photograph simultaneously opposite said two cameras, peripherally gapped discs discontinuously engaging a light-sensitive strip in the focal plane of and within said two cameras, a continuously rotated ratchet wheel, a pawl engaging said ratchet wheel and driving said peripherally gapped discs, a lever holding said pawl out of engagement with said ratchet wheel, an electromagnet attracting said lever from holding said pawl, an electric circuit for said electromagnet, a mercury switch in and rocked to close said electric circuit by said negative photograph, a cam driven by said pawl and restoring said mercury switch, an electric lamp located to illuminate said negative photograph, an electric circuit including said electric lamp, a mercury switch in and dropped to close said lamp circuit, an interrupted cam driven by said pawl and dropping and restoring said mercury switch in said lamp circuit, and means for severing the portion of said light sensitive strip engaged by said second-mentioned peripherally gapped discs.

2. In an automatic photographic machine, two closely mutually adjacent downwardly directed cameras, peripherally gapped discs discontinuously engaging a negative photograph simultaneously opposite said two cameras, peripherally gapped discs discontinuously engaging a light-sensitive strip in the focal plane of and within said two cameras, a continuously rotated ratchet wheel, a pawl engaging said ratchet wheel and driving said peripherally gapped discs, a lever holding said pawl out of engagement with said ratchet wheel, an electromagnet attracting said lever from holding said pawl, an electric circuit of said electromagnet, a mercury switch in and rocked to close said electric circuit by said negative photograph, a cam driven by said pawl and restoring said mercury switch, an electric lamp located to illuminate said negative photograph, an electric circuit including said electric lamp, a mercury switch in and dropped to close said lamp circuit, an interrupted cam driven by said pawl and dropping and restoring said mercury switch in said lamp circuit, a slotted sleeve traversed by said light-sensitive strip, a half-round spindle journalled in said sleeve, a lever arm fast with said half-round spindle, a spring influencing said lever arm, and a cam supporting said lever arm and driven by said pawl.

DAVID SAMUEL BURLEIGH.